United States Patent [19]

Cerf et al.

[11] Patent Number: 5,760,157
[45] Date of Patent: Jun. 2, 1998

[54] AMINOTELECHELIC PARTIALLY HYDROGENATED 1,3-DIENE OLIGOMERS AND PROCESS FOR THE PREPARATION OF THESE COMPOUNDS

[75] Inventors: Martine Cerf, Bernay; Stéphane Fouquay, Mont Saint-Aignan; Joël Perthuis, Bernay, all of France

[73] Assignee: Elf Atochem, S.A., Puteaux, France

[21] Appl. No.: 770,773

[22] Filed: Dec. 20, 1996

[30] Foreign Application Priority Data

Dec. 22, 1995 [FR] France ................... 95 15353

[51] Int. Cl.$^6$ ................................................. C08G 18/62
[52] U.S. Cl. ................ 528/75; 525/333.2; 252/182.18; 564/461; 564/491; 564/509
[58] Field of Search ................. 528/75; 525/333.2; 252/182.18; 564/461, 491, 509

[56] References Cited

U.S. PATENT DOCUMENTS 4,920,181  4/1990  Schmidt et al. .................. 525/327.5

*Primary Examiner*—Rachel Gorr
*Attorney, Agent, or Firm*—Millen, White, Zelano & Branigan, P.C.

[57] ABSTRACT

Compounds of the formula

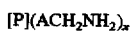

in which P denotes a partially hydrogenated 1,3-diene oligomer residue, x is practically equal to 2 and A denotes a divalent residue such as

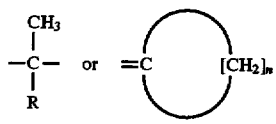

are obtained by selective hydrogenation of compounds of formula $[P_1](ACN)x$ in which $P_1$ denotes a 1,3-diene oligomer residue.

16 Claims, No Drawings

AMINOTELECHELIC PARTIALLY HYDROGENATED 1,3-DIENE OLIGOMERS AND PROCESS FOR THE PREPARATION OF THESE COMPOUNDS

BACKGROUND OF THE INVENTION

The present invention relates to liquid aminotelechelic partially hydrogenated 1,3-diene oligomers exhibiting a low viscosity at ambient temperature, and to a process for the preparation of these oligomers.

The preparation of long-chain α,ω-diamines is described in U.S. Pat. No. 2,647,146. More precisely, this document relates to the synthesis of aminotelechelic hydrogenated butadiene oligomers, which consists in producing, in a first stage, a dinitrile of formula:

(1)

in which n is an integer ranging from 1 to 25, R denotes a generally saturated hydrocarbon radical which has a carbon number ranging from 1 to 6 and —$C_4H_6$— denotes a butadiene unit, and then, in a second stage, in hydrogenating the dinitrile (1) to a primary diamine 20 of formula:

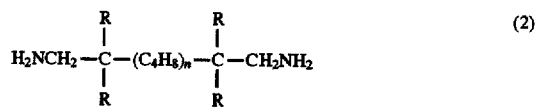
(2)

The dinitrile (1) is obtained by oligomerization of the butadiene in the presence of symmetrical azodinitrile in a solvent medium.

The diamine (2) is obtained by catalytic hydrogenation, in the presence of ammonia, at temperatures of between 180° C. and 300° C. and at pressures ranging from 197 bars to 4,934 bars. The catalyst employed is a mixture of palladium on carbon and of nickel on kiesdguhr. Under these hydrogenation conditions, the —$C_4H_6$— butadiene units are completely hydrogenated to —$C_4H_8$— dihydrobutadiene units of formula (2), consisting of saturated chains which have the structures:

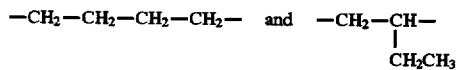

At ambient temperature, the products obtained are in the form of waxes which are difficult to use.

U.S. Pat. No. 4,920,181 also relates to the preparation of long-chain, α,ω-diamines of general formula:

[X](NH$_2$)$_n$ (3)

in which n is a number ranging from 1.4 to 3 and X denotes the residue of a hydrophobic vinyl oligomer which has number-average molecular masses Mn ranging from 200 to 5000. Oligobutadienes and oligoisoprenes are mentioned by way of illustration of such oligomers, as are the corresponding products which have their double bonds partially or completely hydrogenated. As in U.S. Pat. No. 2,647,146, the diamines of formula (3) are obtained in 2 stages.

In a first stage a cyanotelechelic oligobutadiene is prepared by bringing butadiene and a symmetrical azodinitrile into contact in a solvent medium (toluene) at temperatures of between 90° C. and 130° C. at a pressure of approximately 16 to 18 bars.

The hydrogenation of the nitrile functional groups of the cyanotelechelic oligobutadiene thus obtained is performed in a solvent medium, in the presence of ammonia and with a quantity of Raney cobalt equal to 10% by weight relative to the dinitrile to be hydrogenated. This hydrogenation takes place at a temperature of between 100° C. and 200° C. at pressures ranging from 100 bars to 200 bars. These conditions enable the nitrite functional groups to be selectively converted into primary amine functional groups. In addition, it is mentioned that if the hydrogenation period is very long or if Raney nickel is added to the Raney cobalt, the double bonds of the oligobutadiene may be more or less hydrogenated. The hydrogenation conditions mentioned in the document (Examples 5 to 8) are liable to produce aminotelechelic oligobutadienes which have a high content of hydrogenated double bonds which at ambient temperature are in the form of waxy products that are difficult to use.

Although it is indicated in this document that the double bonds can be partially hydrogenated, no indication is given as to the nature of the double bonds affected. However, it is known that 1,3-dienes, especially butadiene, can be 1,4- and 1,2-polymerized. Thus, the 1,4-polymerization of butadiene produces two different configurations:

trans configuration:

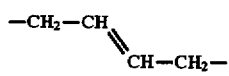

cis configuration:

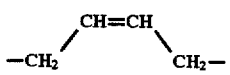

whereas 1,2-polymerization results in the formation of pendant vinyl double bonds:

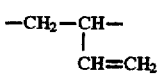

A random distribution of the 3 structures is obtained with a molar percentage of pendant vinyl double bonds close to 20%.

However, the Applicant Company has found that, according to certain hydrogenation conditions, it could hydrogenate at least 20% of the double bonds originating from the 1,2-polymerization of 1,3-dienes, hereinafter referred to as 1,2 double bonds, while keeping practically intact the double bonds originating from the 1,4-polymerization, which are hereinafter referred to as double bonds of 1,4 type (cis and trans).

SUMMARY OF THE INVENTION

The present invention therefore provides a process for the preparation of aminotelechelic partially hydrogenated 1,3-diene oligomers containing at least 20 mol % of 1,2 hydrogenated double bonds type and, preferably, a percentage ranging from 25% to 30%, and a percentage not exceeding 10 mol % of hydrogenated double bonds of the 1,4 (cis and trans) type and, preferably, a molar percentage lower than 1%.

The present invention also provides, by way of new products, to aminotelechelic partially hydrogenated 1,3-diene oligomers of formula:

[P](ACH$_2$NH$_2$) (4)

in which x is a number ranging from 1.8 to 2 and preferably practically equal to 2, P denotes a 1,3-diene oligomer residue containing at least 20 mol % of hydrogenated double bonds of 1,2 type of structure (a):

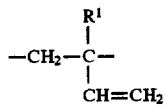

and at most 10 mol % of hydrogenated double bonds of 1,4 (cis and trans) type of structure (b):

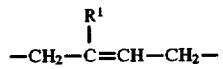

$R^1$ in the structures (a) and (b) denotes a hydrogen atom or an aliphatic hydrocarbon radical containing from 1 to 6 carbon atoms, A denotes a divalent residue chosen from the residues:

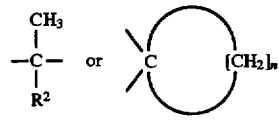

in which $R^2$ denotes a linear or branched aliphatic hydrocarbon radical which has a carbon number ranging from 1 to 6 or a cycloaliphatic radical which has a carbon number ranging from 3 to 7, n is an integer ranging from 3 to 9, the said aminotelechelic partially hydrogenated 1,3-diene oligomer having a number-average molecular mass Mn ranging from 500 to 5000 and, preferably, a mass Mn of between 1000 and 3000.

Butadiene ($R^1$=H) and isoprene ($R^1$=CH3—) will be mentioned by way of illustration of 1,3-diene forming part of the constitution of the partially hydrogenated 1,3-diene oligomer P. The invention relates very particularly to the use of butadiene.

According to the present invention the molar percentage of the hydrogenated 1,2 double bonds is preferably between 25% and 30% and the percentage of hydrogenated double bonds of the 1,4 (cis and trans) type is preferably lower than 1%.

Among the divalent residues of structure:

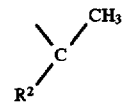

preference is given to those in which $R^2$ denotes an isobutyl, a cyclohexyl and very particularly a methyl.

Among the divalent residues of structure:

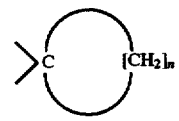

preference is given to those in which n is equal to 4, 5 and 6.

The process in accordance with the invention for the preparation of aminotelechelic partially hydrogenated 1,3-diene oligomers of formula (4) consists in oligomerizing a 1,3-diene of formula:

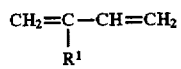

in which $R^1$ has the abovementioned meaning, in the presence of a symmetrical azodinitrile of formula

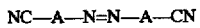 (5)

A having the same meaning as in formula (4), to a cyanotelechelic 1,3-diene oligomer of formula:

$[P_1](ACN)_x$ (6)

in which $P_1$ denotes a 1,3-diene oligomer residue, A and x having the same meanings as in formula (4), and in then hydrogenating it in the presence of Raney cobalt, the said process being characterized in that the hydrogenation of the cyanotelechelic 1,3-diene oligomer (6) is performed at temperatures ranging from 100° C. to 200° C. and preferably between 140° C. and 180° C., at a hydrogen pressure ranging from $5\times10^5$ Pa to $30\times10^5$ Pa and, preferably between $10\times10^5$ Pa and $15\times10^5$ Pa, in the presence of a quantity of Raney cobalt not exceeding 5% by weight relative to the cyanotelechelic 1,3-diene oligomer used, and in the absence of ammonia.

According to the present invention the hydrogenation period may vary to a wide extent and is not critical. However, it is preferred not to exceed a hydrogenation period of 30 hours and, preferably, this period is between 2 and 25 hours. The hydrogenation reaction may be carried out in bulk or in a solvent. It is preferred to employ an inert solvent of aliphatic type, such as the paraffins which have a carbon number ranging from 6 to 12 and, preferably, ranging from 8 to 12. Octane, nonane, decane or else a mixture of at least two of the abovementioned compounds will be mentioned by way of illustration of such compounds. It is also possible to employ petroleum cuts consisting of paraffins or else of naphthenes. The use of solvents containing nonaromatic unsaturated compounds will be avoided.

The quantity of Raney cobalt which can be employed is at most 5% by weight relative to the cyanotelechelic 1,3-diene oligomer used. A quantity by weight of between 0.1% and 2.5% will preferably be employed. A Raney cobalt which has a weight content of cobalt of at least 80% and, preferably, of between 85% and 95%, will preferably be employed.

According to the present invention the reaction of hydrogenation of the cyanotelechelic 1,3-diene oligomers of formula (6) is performed in the absence of ammonia, and, surprisingly, secondary and/or tertiary amines have been found to be absent. In addition, the conversion of the nitrile functional groups into primary amine functional groups is higher than 95%. The cyanotelechelic 1,3-diene oligomers of formula (6) are known and described in the literature, and their preparation does not form the subject-matter of the invention. These compounds can be obtained particularly by polymerizing a 1,3-diene in the presence of an initiator of the symmetric azodinitrile type of formula (5), optionally in a solvent medium (acetone), at a temperature of between 60° C. and 140° C. and at pressures ranging from 5 bars to 35 bars.

The number-average molecular mass Mn of the cyanotelechelic 1,3-diene oligomer is controlled by varying the azodinitrile/1,3-diene molar ratio.

The operation will preferably be carried out so as to have number-average molecular masses Mn ranging from 500 to 5000 and preferably between 1000 and 3000.

The following will be mentioned by way of illustration of symmetrical azodinitriles of formula (5) which can be employed according to the present invention:

2,2'-azobisisobutyronitrile (AIBN), 2,2'-azobis-2-methylbutyronitrile, 2,2'-azobis-2,4-imethylvaleronitrile, 1,1'-azobis-1-cyclohexanecarbonitrile, 2,2'-azobiscyclohexylpropionitrile. It is preferred to employ 2,2'-azobisisobutyronitrile.

According to a preferred procedure the cyanotelechelic 1,3-diene oligomer, the solvent and freshly prepared Raney cobalt are introduced into an autoclave fitted with a means of stirring.

Heating is applied to a temperature of 100° C./120° C. under a purge of an inert gas such as nitrogen and then, after the nitrogen purging has been stopped, the reaction mixture is heated to a temperature not exceeding 200° C. and preferably to a temperature of between 140° C. and 180° C. Hydrogen is then introduced and the hydrogen pressure is brought to at most 30 bars and, preferably, between 10 bars and 15 bars.

The temperature and the pressure are maintained until a virtually complete (>95%) conversion of the nitrile functional groups to $CH_2NH_2$ functional group is observed. This can be measured in particular via the alkalinity.

After cooling, the Raney cobalt is removed by filtration and then the solvent is removed next by evaporation at reduced pressure. A liquid product is obtained which is clear and virtually colourless.

Under these conditions a degree of hydrogenation of all the double bonds in the cyanotelechelic 1,3-diene oligomer of at most 25% is obtained.

This degree of hydrogenation can be determined particularly via the iodine value of the products obtained, which is between 250 and 400.

By nuclear magnetic resonance (NMR) analysis of carbon 13 ($^{13}C$) it is found that the degree of hydrogenation of the double bonds of 1,4 (cis and trans) type is at most 10% and generally lies below 1%, and that the degree of hydrogenation of the double bonds of 1,2 type is at least 20% and preferably lies between 25% and 30%.

The total degree of hydrogenation of the double bonds is advantageously between 5% and 15%.

The number-average molecular mass Mn of the aminotelechelic partially hydrogenated 1,3-diene oligomer obtained is a function of the number molecular mass Mn of the cyanotelechilic 1,3-diene oligomer used.

This molar mass Mn is between 500 and 5000 and, preferably, between 1000 and 3000.

The aminotelechelic partially hydrogenated 1,3-diene oligomers of the present invention have the advantage of being liquids of low viscosity and of low colour (colour value on the Gardner scale lower than 4). They generally exhibit viscosities which are lower than 2000 mPa s at 30° C.

Their glass transition (Tg), measured by DSC, lies between −85° C. and −75° C.

Such oligomers can be employed especially in the synthesis of block copolymers, in the synthesis of polyureas and in polyurethane formulations as an "activator" of reactivity of hydroxylated polybutadienes. In addition, the oligomers can be used as an intermediate to produce polymeric emulsifiers and molding compositions in the same manner mentioned in U.S. Pat. No. 4,920,181, for example.

Without further elaboration, it is believed that one skilled in the art can, using the preceding description, utilize the present invention to its fullest extent. The following preferred specific emobidments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire dislcosures of all applications, patents and publications, cited above and below, and of corresponding French application 95/1535, are hereby incorporated by reference.

EXAMPLE 1

Preparation of a cyanotelechelic 1,3-butadiene oligomer:

91.08 g, that is 0.555 mol, of 2,2'-azobisisobutyronitrile (AIBN) are introduced into a 5-liter autoclave and then, after the autoclave has been hermetically closed and deoxygenated, 2000 g of butadiene (36.975 mol) are introduced. The reaction mixture is stirred and heated to 92° C., at which temperature it is maintained for 3 hours. The pressure varies between $14 \times 10^5$ Pa and $18 \times 10^5$ Pa during the reaction period.

After cooling the reaction mixture to approximately 20° C., the excess butadiene is removed by degassing. The colorless and clear residual liquid obtained (722 g) is next introduced into a rotary evaporator and then residual dissolved butadiene liable to be dissolved and possibly the few volatile impurities are removed at reduced pressure.

After filtration of the product thus treated 595 g of a cyanotelechelic 1,3-butadiene oligomer are obtained which exhibit the following physicochemical characteristics:

yield: 28% relative to the butadiene introduced,

Brookfield viscosity at 30° C.: 980 mPa s number-average molecular mass Mn, determined by gel permeation chromatography (standard polystyrene corrected to polybutadiene equivalent): 1380 iodine value=406

The cyanotelechelic 1,3-butadiene oligomer was identified by $^{13}C$ NMR on a Brucker® instrument (frequency for $^{13}C$=75.47 MHz) with $CDCl_3$ as solvent.

The molar percentage of the double bonds of 1,4 (cis and trans) type is equal to 79% and that of the 1,2 double bonds of is equal to 21%.

EXAMPLE 2

(in accordance with the invention)

Hydrogenation of the cyanotelechelic 1,3-butadiene oligomer obtained in Example 1.

The Raney cobalt employed is a type A-8000® Raney cobalt marketed by Activated Metal and Chemicals Inc. It is composed of 86% to 95% of cobalt and of 5 to 14% of aluminium.

Into a 1-liter autoclave fitted with a stirring device, with means of heating and with temperature and pressure metering are introduced 300 g of the cyanotelechelic 1,3-butadiene oligomer of Example 1, 45 g of octane and 6 g of Raney cobalt, that is 2% by weight relative to the dinitrile used. The Raney cobalt has been prewashed with methanol to remove most of the water which it contained. Next, heating is applied to 120° C. under nitrogen purging and this temperature is maintained for the time needed to obtain a water content lower than 250 ppm.

The nitrogen purge is turned off and the temperature is brought to 140° C. Hydrogen is introduced and the total hydrogen pressure is brought to $12 \times 10^5$ Pa. The temperature and the pressure are maintained for 12 hours, after which period the degree of conversion of the —CN functional groups to $CH_2NH_2$ is higher than 95 %. To do this, the alkalnity is measured which, in this case, is equal to 1.33 meq HCl/g. The Raney cobalt is next removed by filtration and the octane is evaporated off at reduced pressure.

A slightly colored clear product is obtained which has a color value on the Gardner scale equal to 3, which has the following physicochemical characteristics:

Brookfield viscosity at 30° C.: 1300 mPa s
number-average molecular mass Mn: 1400
functionality: 1.86

The changes in these reaction parameters and the physicochemical characteristics of the aminotelechelic partially hydrogenated 1,3-butadiene oligomers are collated in Table 1.

In this table, the percentages of hydrogenation of the double bonds and of the nitrile functional groups have been determined by $^{13}C$ NMR according to the calculation method shown in Example 2.

TABLE 1

| | REACTION PARAMETERS | | | | PERCENTAGE HYDROGENATION | | | |
|---|---|---|---|---|---|---|---|---|
| EXAMPLE | T (°C.) | Total hydrogen pressure ×10⁵ Pa | Raney cobalt (%) | Duration (h) | 1,4 (cis and trans) type (%) | 1,2 type (%) | of the —CN or —CH₂NH₂ groups | IODINE VALUE |
| 3 | 160 | 12 | 1 | 13 | 0.5 | 28 | 99.1 | 384 |
| 4 | 160 | 12 | 0.5 | 25 | 0 | 26 | 97 | 401 |
| 5 | 120 | 18 | 2 | 25 | 7.75 | 28.5 | 98 | 387 |
| 6 | 140 | 12 | 1 | 20 | 3.4 | 23.5 | 96 | 400 | glass transition temperature measured by differential thermal analysis (DTA): −80° C.
iodine value=387.

The percentage of the double bonds of 1,2 and 1,4 (cis and bans) type and the degree of conversion of the —CN functional groups to —$CH_2NH_2$ were determined by NMR on a Brucker instrument and under the same conditions as mentioned in Example 1.

In the $^{13}C$ NMR spectrum of the resultant aminotelechelic partially hydrogenated 1,3-butadiene oligomer, the characteristic lines of the carbons of the $CH_2NH_2$ groups are detected between 50 ppm and 56 ppm, corresponding to the hydrogenated CN chain ends. The characteristic lines of the —CN chain ends lie at approximately 125 ppm.

The integrations of these lines enable the degree of conversion of the —CN functional groups to $CH_2NH_2$ to be determined, which, in the present case, is close to 95%.

The line between 10 ppm and 12 ppm corresponds to the —$CH_3$ groups of the hydrogenated 1,2 double bonds. Its integration, combined with that of the lines situated at approximately 143 ppm and between 126 and 136 ppm, which correspond, respectively, to the double bonds of 1,2 type and to the double bonds of 1,4 (cis and trans) type, allows the percentage of hydrogenated double bonds of 1,2 type to be calculated. The content of —$CH_2$— due to the hydrogenation of the double bonds of 1,4 (cis and trans) type is determined by calculation, assuming a ratio of 21%–79% of 1,2 double bonds and of 1,4 (cis and trans) type.

Thus, in the case of the aminotelechelic partially hydrogenated 1,3-butadiene oligomer obtained according to the abovementioned hydrogenation conditions, the percentage of hydrogenated double bonds is equal to 2% and the percentage of 1,2 hydrogenated double bonds is equal to 25.5%.

EXAMPLES 3, 4, 5 and 6
(in accordance with the invention)

In Examples 3, 4, 5 and 6, which follow, the hydrogenation of the cyanotelechelic 1,3-butadiene oligomer obtained in Example 1 is performed.

The procedure is as in Example 2, except that some reaction parameters (pressure, temperature, percentage of Raney cobalt) are varied.

EXAMPLE 7
(not in accordance with the invention)

We have hydrogenated the cyanotelechelic 1,3-butadiene oligomer obtained in Example 1 according to the hydrogenation conditions mentioned in U.S. Pat. No. 4,920,181 (examples 5 to 8).

These conditions are:

temperature T: 200° C.

catalyst: Raney cobalt, 10% by weight relative to the dinitrile used solvent: toluene presence of ammonia total pressure: 100×10⁵ Pa with a hydrogen partial pressure equal to 70×10⁵ Pa and an ammonia partial pressure equal to 30×10⁵ Pa hydrogenation period: 10 hours.

Under these hydrogenation conditions:

95% of the 1,2 double bonds are hydrogenated, and 31.9% of the double bonds of 1,4 (cis and trans) type are hydrogenated.

The conversion of the —CN functional groups to $CH_2NH_2$ is virtually quantitative.

The product obtained is waxy.

EXAMPLE 8

The "minotelechelic partially hydrogenated 1,3-butadiene oligomer of Example 2 (referred to hereinafter as diamino oligomer) was tested as reactivity activator in a polyurethane formulation.

A hydroxylated polybutadiene with a functionality of 2.3 was formulated with 10% by weight of the diamino oligomer which had a functionality of 1.85. An equimolecular quantity of diisocyanate in relation to the —OH and —$NH_2$ functional groups was introduced, and the kinetics of getting or reaction kinetics were measured by determining the viscosity. The gelling begins after 40 minutes when 10% by weight of diaino oligomer have been added, whereas it begins only after 80 minutes in the absence of the said diamino oligomer.

Under these conditions the diamino oligomer has made it possible to double the reactivity of the polyurethane system.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed:

1. Aminotelechelic partially hydrogenated 1,3 diene oligomers of formula (4) [P](ACH$_2$NH$_2$) in which x is a number ranging from 1.8 to 2 (inclusive); P denotes a 1,3-diene oligomer residue containing at least 20 mol % of hydrogenated 1,2 double bonds of structure (a)

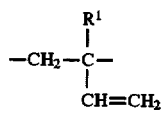

and at most 10 mol % of hydrogenated double bonds of 1,4 (cis and trans) type of structure (b)

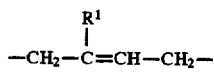

$R^1$ in the structures (a) and (b) denotes a hydrogen atom or an aliphatic hydrocarbon radical containing from 1 to 6 carbon atoms; A denotes a divalent residue chosen from the residues:

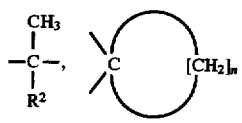

in which $R^2$ denotes a linear or branched aliphatic hydrocarbon radical which has a carbon number ranging from 1 to 6 or a cycloaliphatic radical which has a carbon number ranging from 3 to 7, n is an integer ranging from 3 to 9, and the said oligomer (4) has a number-average molecular mass Mn ranging from 500 to 5000.

2. Oligomers according to claim 1, wherein the radical $R^1$ is a hydrogen atom.

3. Oligomers according to claim 1 wherein the molar percentage of 1,2 hydrogenated double bonds is between 25% and 30% and the molar percentage of hydrogenated double bonds of 1,4 (cis and trans) type is lower than 11%.

4. Oligomers according to claim 1 wherein the radical $R^2$ is a methyl.

5. Oligomers according to claim 1 wherein the number-average molecular mass Mn is between 1000 and 3000.

6. A process for the preparation of aminotelechelic partially hydrogenated 1,3-diene oligomers of formula (4) of claim 1, comprising hydrogenating in the presence of Raney cobalt a cyanotelechelic 1,3-diene oligomer of formula $$[P_1](ACN)_x \qquad (6)$$

in which P1 denotes a 1,3-diene oligomer residue, A and x having the same meanings as in formula (4), of number-average molecular mass Mn ranging from 500 to 5000, characterized in that the hydrogenation is performed at temperatures ranging from 100° C. to 200° C., at a total hydrogen pressure ranging from 5×10$^5$ Pa to 30×10$^5$ Pa, in the presence of a quantity of Raney cobalt not exceeding 5% by weight relative to the cyanotelechelic 1,3-diene oligomer (6), and in the absence of ammonia.

7. A process according to claim 6, wherein the hydrogenation is performed at a temperature of between 140° C. and 180° C.

8. A process according to claim 6, wherein the hydrogenation is performed at a total hydrogen pressure of between 10×10$^5$ Pa and 15×10$^5$ Pa.

9. A process according to claim 6 wherein the hydrogenation is performed in the presence of a quantity of Raney cobalt of between 0.1% and 2.5% by weight relative to the cyanotelechelic 1,3-diene oligomer.

10. In a process comprising reacting hydroxylated polybutadienes the improvement comprising conducting said reacting in the presence of the aminotelechelic partially hydrogenated 1,3-diene oligomers of formula (4) of claim 1 as activator of reactivity.

11. Oligomers according to claim 3, wherein the radical $R^1$ is a hydrogen.

12. Oligomers according to claim 11, wherein the radical $R^2$ is a methyl.

13. Oligomers according to claim 12, wherein the number-average molecular mass Mn is between 1000 and 3000.

14. A process according to claim 7, wherein the hydrogenation is performed at a total hydrogen pressure of between 10×10$^5$ Pa and 15×10$^5$ Pa.

15. A process according to claim 14, wherein the hydrogenation is performed in the presence of a quantity of Raney cobalt of between 0.1% and 2.5% by weight relative to the cyanotelechelic 1,3-diene oligomer.

16. A process according to claim 6, wherein the number-average molecular mass Mn ranges between 1000 and 3000.

* * * * *